(12) United States Patent
Iwakata et al.

(10) Patent No.: US 10,399,472 B2
(45) Date of Patent: Sep. 3, 2019

(54) SEAT FITTED WITH GARNISH

(71) Applicant: TS TECH CO., LTD., Saitama (JP)

(72) Inventors: So Iwakata, Tochigi (JP); Akira Shirai, Tochigi (JP); Yohei Urabe, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 17 days.

(21) Appl. No.: 15/943,822

(22) Filed: Apr. 3, 2018

(65) Prior Publication Data

US 2018/0279791 A1 Oct. 4, 2018

(30) Foreign Application Priority Data

Apr. 4, 2017 (JP) .................................. 2017-074269

(51) Int. Cl.
*B60N 2/68* (2006.01)
*B60R 22/26* (2006.01)
*B60R 22/18* (2006.01)

(52) U.S. Cl.
CPC .............. *B60N 2/688* (2013.01); *B60R 22/26* (2013.01); *B60R 2022/1818* (2013.01)

(58) Field of Classification Search
CPC .......... B60N 2/688; B60N 2/90; B60R 22/26; B60R 2022/1818; B60R 2022/263; B60R 2022/266
USPC .................................. 297/452.38, 473, 463.1
See application file for complete search history.

(56) References Cited

U.S. PATENT DOCUMENTS

| | | | | |
|---|---|---|---|---|
| 4,637,650 A | * | 1/1987 | Inoue ....................... | B60N 2/58 297/378.13 |
| 4,786,103 A | * | 11/1988 | Selbert ..................... | B60N 2/70 297/452.38 |
| 5,716,073 A | * | 2/1998 | Redman ................... | B60R 22/26 280/801.1 |
| 6,637,822 B1 | * | 10/2003 | Kato ........................ | B60N 2/80 297/397 |
| 7,367,603 B2 | * | 5/2008 | Adachi .................... | B60N 2/80 296/63 |
| 8,733,834 B2 | * | 5/2014 | Palmer .................... | B60N 2/585 297/218.1 |
| 8,820,790 B2 | * | 9/2014 | Wenz ....................... | B60N 2/58 280/801.1 |
| 2017/0066357 A1 | * | 3/2017 | Ito .......................... | A47C 31/02 |

FOREIGN PATENT DOCUMENTS

| | | | |
|---|---|---|---|
| JP | H 10181524 | | 7/1998 |
| JP | 2002336078 A | * | 11/2002 |
| JP | 2006043000 | | 2/2006 |

* cited by examiner

*Primary Examiner* — Milton Nelson, Jr.
(74) *Attorney, Agent, or Firm* — Dority & Manning, P.A.

(57) ABSTRACT

A seat is provided with: a frame; a pad supported by the frame; a skin member covering a front surface of the pad and provided with a first opening; an annular plate having a second opening and attached to a part of the skin member surrounding the first opening so that the first opening opposes the second opening; and a garnish including a tubular portion passed into the first opening and the second opening, and retained onto the pad, a flange provided at a front end of the tubular portion and having a larger outer diameter than the tubular portion, and an engagement claw projecting from an outer periphery of the tubular portion, and engaging the annular plate between the flange and the engagement claw.

13 Claims, 9 Drawing Sheets

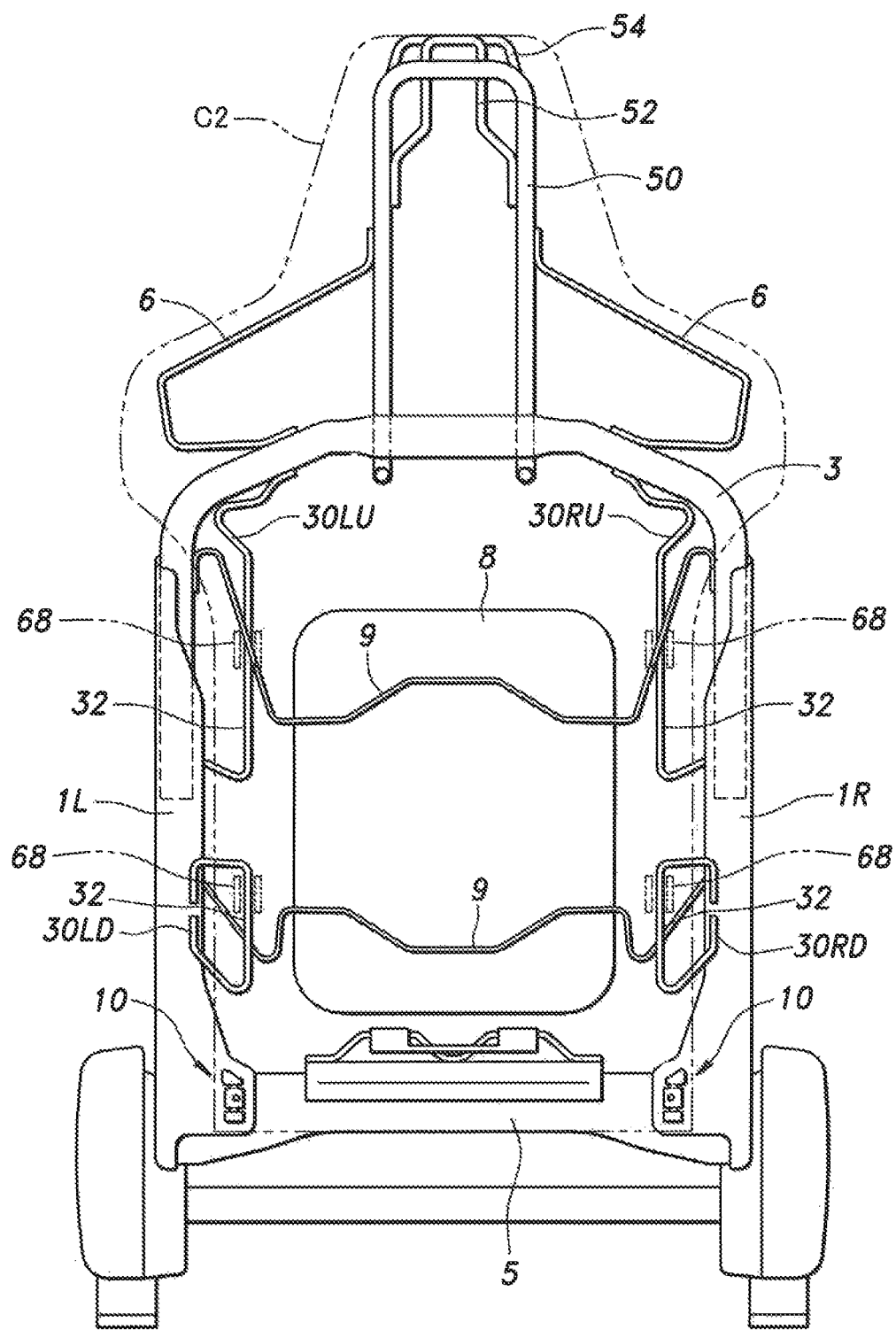

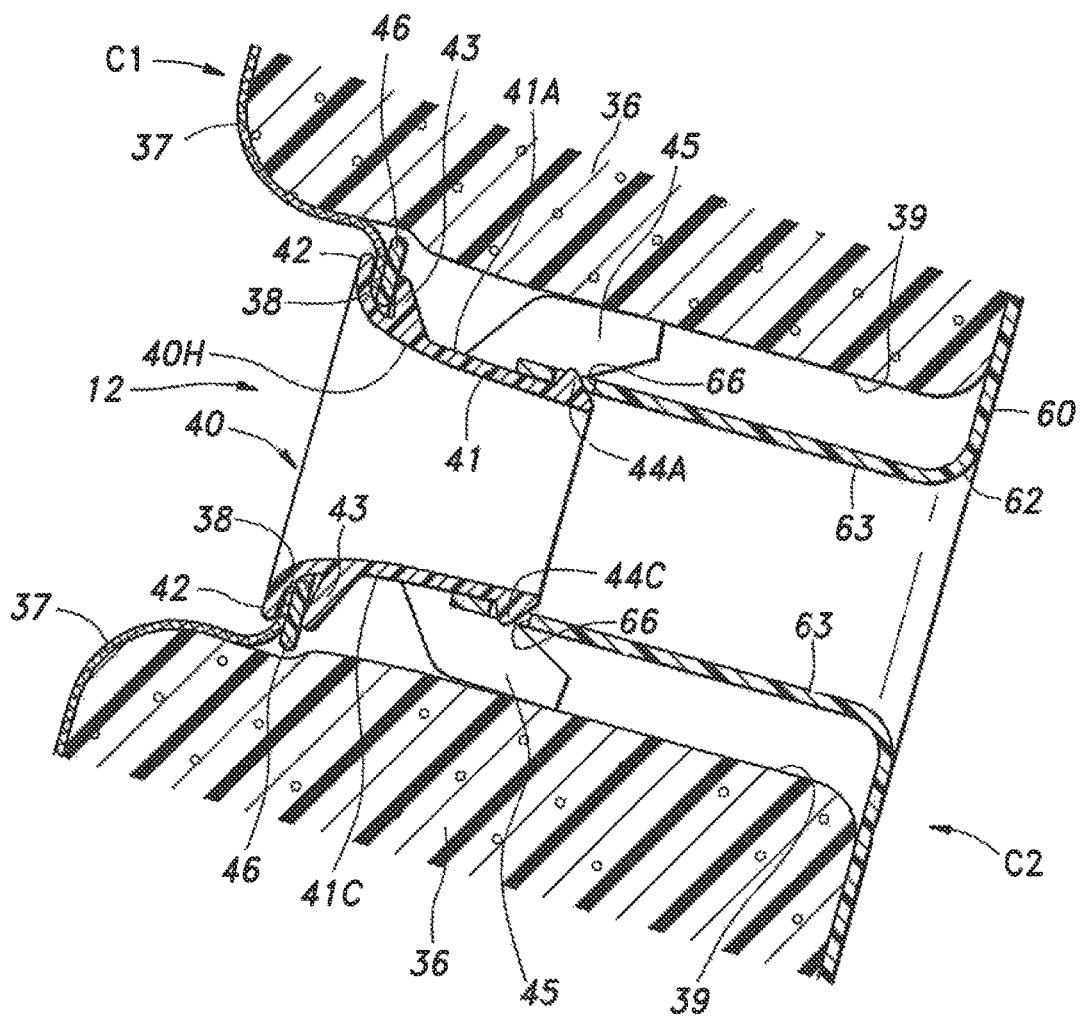

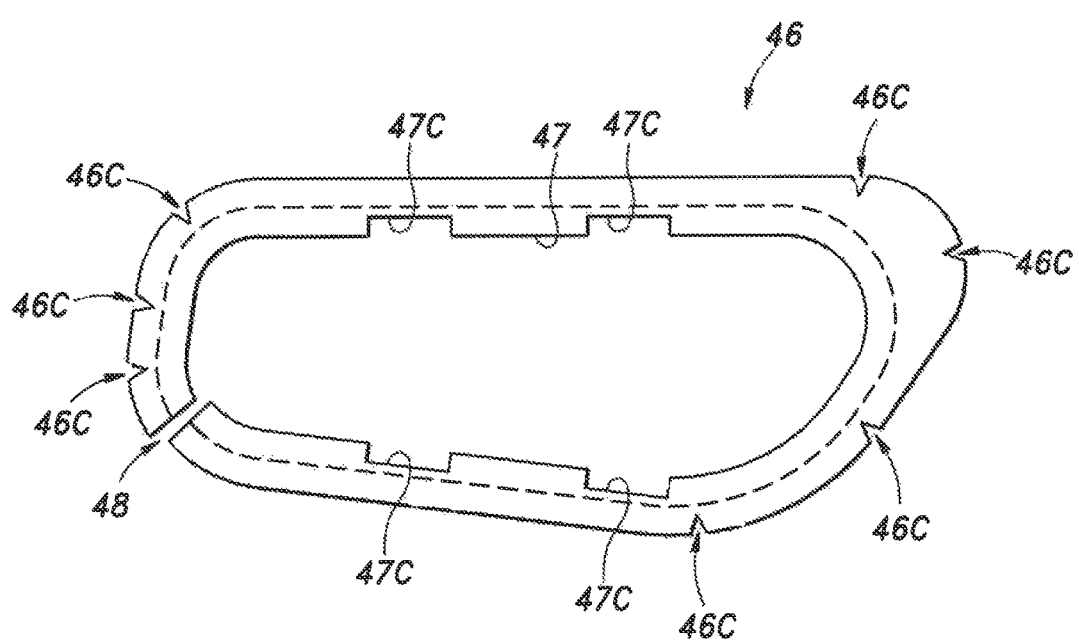

SEAT FITTED WITH GARNISH

CROSS REFERENCE TO RELATED APPLICATIONS

This application claims priority to Japanese Patent Application Number 2017-074269 having a filing date of Apr. 4, 2017, which is incorporated herein by reference.

TECHNICAL FIELD

The present invention relates to a seat, and in particular to a seat provided with an opening which is fitted with a garnish.

BACKGROUND ART

Certain vehicle seats are provided with openings in the seat back for the purpose of passing a seat belt, an ornamental effect or for ventilation. An annular plate member may be fitted to each opening for maintain the shape of the opening. See JPH10-181524A and JP2006-43000A, for instance. In the prior art disclosed in JPH10-181524A, the opening is designed for passing a seat belt, and a belt guide also serving as a member for retaining the shape of the opening is attached to the peripheral part of the opening. This belt guide is attached to the skin member via a frame member attached to the peripheral part of the skin member surrounding the opening of the skin member. The frame member is provided with projections that fit into corresponding openings formed in the peripheral part of the skin member in order to ensure a secure attachment between the skin member and the frame member.

In the prior art disclosure in JP2006-43000A, ventilation openings are passed through a head rest of a seat in the fore and aft direction, and a garnish serving as a member for retaining the shape of the opening is fitted into an opening of the skin member. The garnish is provided with projections that fit into corresponding openings formed in the peripheral part of the skin member in order to ensure a secure attachment between the skin member and the garnish.

The member for retaining the shape of the opening of the skin member is typically made of plastic material which is harder than the pad and the skin member. Therefore, when a tension is applied to the pad or the skin member, the pad or the skin member may deform to such an extent that a gap may be created between the shape retaining member and the skin member. Such a gap is not desirable not only because of an esthetic view point but also because of the risk of catching a foreign object therein. Also, because the skin member is engaged by the projections projecting from the shape retaining member, an excessive tension applied to the skin member may tear up from the holes thereof receiving the projections therein.

SUMMARY OF THE INVENTION

In view of such problems of the prior art, a primary object of the present invention is to provide a seat provided with an opening fitted with a garnish in which a skin member on the surface of the seat is protected from tearing and a gap between the garnish and the skin member can be avoided.

To achieve such an object, the present invention provides a seat (S), comprising: a frame (F2); a pad (36) supported by the frame; a skin member (37) covering a front surface of the pad and provided with a first opening (38); an annular plate (46) having a second opening (47) and attached to a part of the skin member surrounding the first opening so that the first opening opposes the second opening; and a garnish (40) including a tubular portion (41) passed into the first opening and the second opening, and retained onto the pad, a flange (42) provided at a front end of the tubular portion and having a larger outer diameter than the tubular portion, and an engagement claw (43) projecting from an outer periphery of the tubular portion, and engaging the annular plate between the flange and the engagement claw.

Because the annular plate attached to the skin member is retained by the garnish, even when the skin member is placed under tension, the annular plate is prevented from moving relative to the garnish so that a gap is prevented from being created between the skin member and the garnish.

A part of the skin member surrounding the first opening may be interposed between the flange and the engagement claw jointly with the annular plate.

Thereby, the retaining of the annular member is simplified.

According to a preferred embodiment of the present invention, the seat further comprises a back board (C2) covering a rear surface of the pad and attached to the frame; wherein the pad is provided with a third opening (39) passed therethrough in alignment with the first opening and the second opening, and a rear end of the tubular portion of the garnish is passed into the third opening, and is connected to the back board.

By thus connecting the rear end of the tubular portion of the garnish to the back board, both the garnish and the back board can be securely attached to the main part of the seat in a both simple and a reliable manner.

Preferably, the back board is provided with a tubular extension (63) projecting forward and centrally defining a fourth opening (62) of the back board, and the rear end of the tubular portion of the garnish fits into or onto a front end of the tubular extension of the back board, the rear end of the tubular portion of the garnish and the front end of the tubular extension of the back board being engaged to each other via an engagement feature.

Thereby, the garnish and the back board can be securely attached to the main part of the seat in an even more simple and reliable manner.

Preferably, the engagement feature includes an engagement claw (44A) with a barbed configuration projecting from an outer periphery of the tubular portion, and a hole (66) formed in a front end portion of the tubular extension of the back board and configured to receive the engagement claw.

Thereby, the garnish and the back board can be firmly joined to each other simply by pushing the two parts toward each other.

Preferably, the tubular portion of the garnish is provided with a plurality of radial projections (45) projecting outward from an outer periphery thereof, and abutting an inner peripheral surface of the third opening of the pad.

Thereby, the tubular portion of the garnish can be positioned in the third opening of the pad in a stable manner so that the tubular portion and the tubular extension can be aligned to each other in a reliable manner. This simplifies the assembly work on the one hand, and increases the mechanical stability of the connection between the garnish and the back board during use on the other hand.

An inner peripheral part of the annular plate may be provided with a plurality of cutouts (47C) at positions corresponding to the radial projections (45) on the tubular portion of the garnish.

Thereby, the annular plate can be correctly fitted onto the tubular portion of the garnish in an effortless manner.

An outer peripheral part of the flange of the annular plate may be provided with a plurality of notches (46C), and parts of the skin member corresponding to the notches are provided with corresponding markings (37C).

Thereby, the annular plate can be correctly positioned relative to the skin member in an effortless manner.

The annular plate may be sewn to the skin member.

Thereby, the two parts can be joined to each other in a reliable manner.

Preferably, the annular plate is sewn to the skin member along a circumferential direction of the first opening.

Thereby, the stress applied to the skin member can be spread to a large part of the annular plate so that the skin member is favorably protected from tearing.

The annular plate may be provided with a cut (48) extending between an outer periphery thereof and an inner periphery thereof.

Thereby, the annular plate can be made so deformable that the assembling of the annular plate may be facilitated. The cut allows the sewing needle of a sewing machine to be moved to a desired position when starting the sewing process, and the mechanical strength of the joint between the annular plate and the skin plate may be maximized.

Preferably, the engagement claw (43) is provided with a barbed configuration so that the annular plate may be firmly interposed between the flange and the engagement claw simply by pushing the annular plate over the barbed engagement claw into abutment onto the flange.

BRIEF DESCRIPTION OF THE DRAWING(S)

FIG. 3 is a rear view of the vehicle seat with a pad assembly and a back board omitted from illustration;

FIG. 4 is a sectional view taken along line IV-IV of FIG. 2;

FIG. 6 is a front view of an annular plate;

DESCRIPTION OF THE PREFERRED EMBODIMENT(S)

A preferred embodiment of the present invention is described in the following with reference to the appended drawings. A vehicle seat S according to this embodiment is known as a bucket seat which is contoured to conform to a bottom side and a back side of an occupant. As the vehicle seat S is symmetrical about a longitudinally and vertically extending center plane, only one side of the vehicle seat S may be described in some places of the following description to avoid redundancy.

Figure 1:
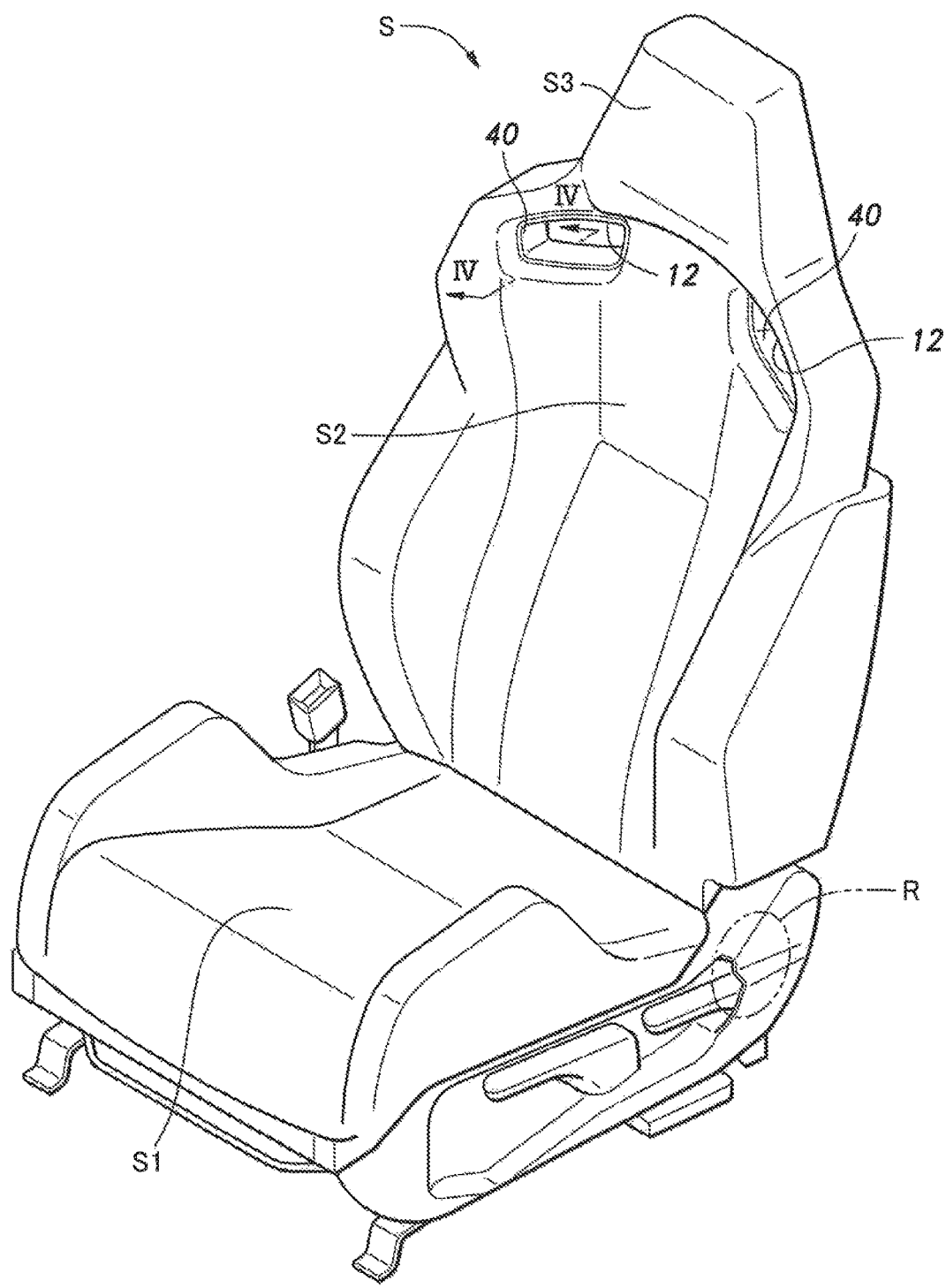
FIG. 1 is a perspective view of a vehicle seat according to a first embodiment of the present invention.
Figure 2:
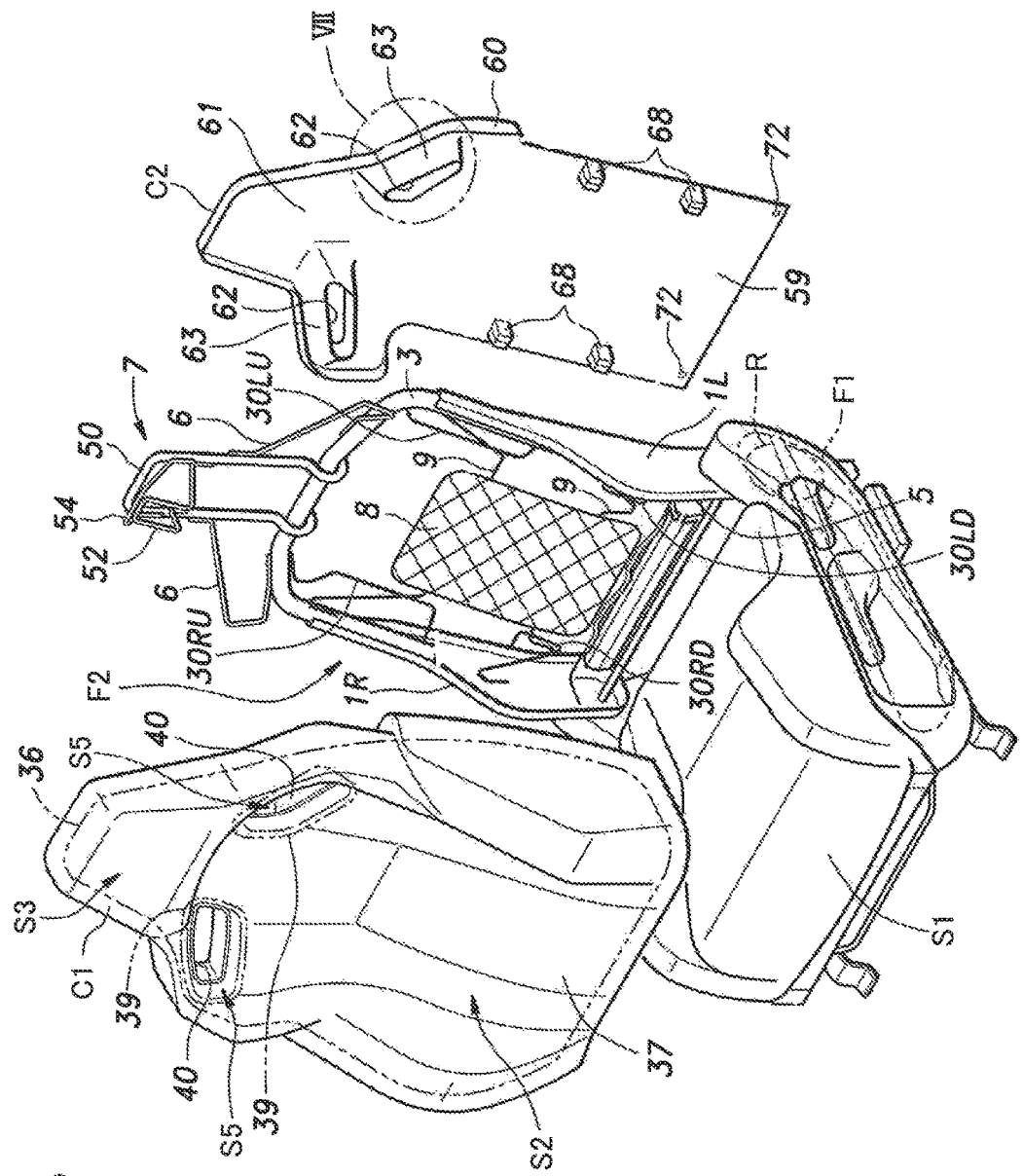
FIG. 2 is an exploded perspective view of the vehicle seat.
Figure 5A:
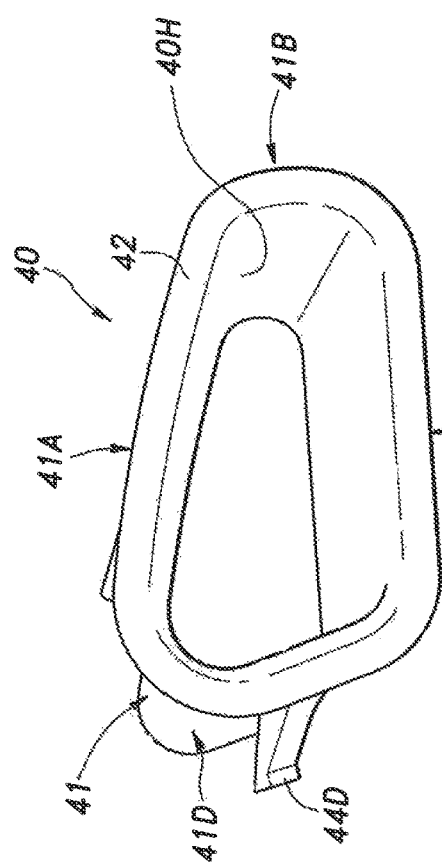
FIG. 5a is a front perspective view of a garnish of the vehicle seat.
Figure 5B:
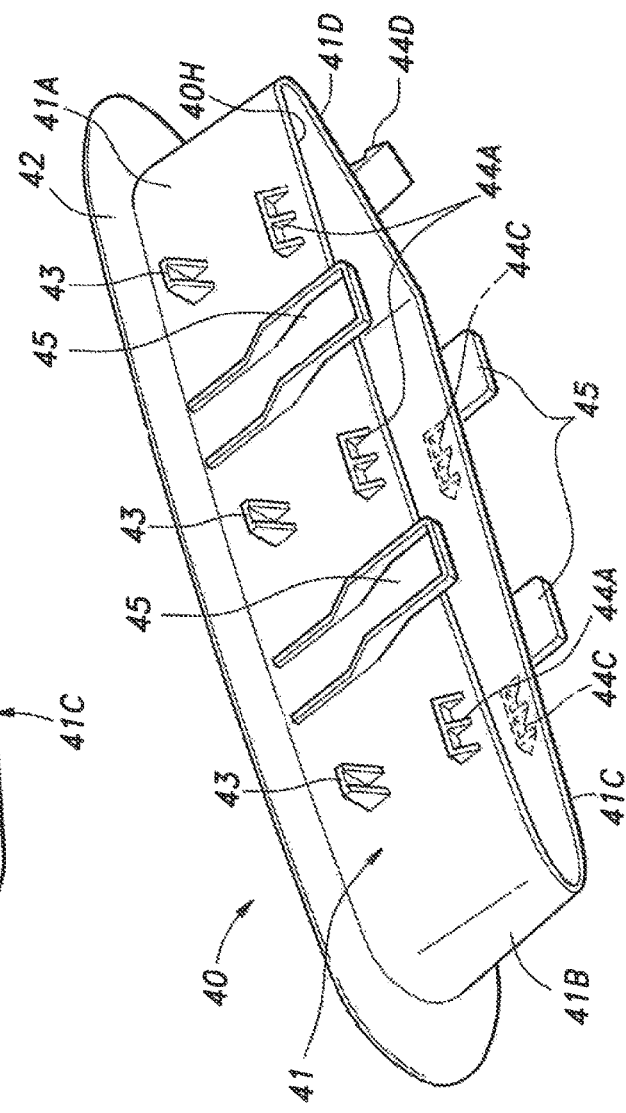
FIG. 5b is a rear perspective view of the garnish.

As shown in FIGS. 1 and 2, the vehicle seat S includes a seat cushion S1 and a seat back S2 integrally formed with a head rest S3. The seat cushion S1 is provided with a seat cushion frame, a pad supported by the seat cushion frame and a skin member covering the upper side of the pad, and supports the buttocks and thighs of the occupant. The seat cushion frame includes a pair of cushion side frames F1 extending in the fore and aft direction and a plurality of cross frames connected between the inner side faces of the two cushion side frames F1. A pair of openings 12 are formed in parts of the seat back S2 corresponding to the shoulders of the occupant for ornamental or ventilation purposes. Such openings may also be used for passing shoulder belts of a harness seatbelt.

The seat back S2 is provided with a seat back frame F2, a pad assembly C1 attached to the seat back frame F2 from the front, and a back board C2 attached to the seat back frame F2 from behind. As shown in FIGS. 2 and 3, the seat back frame F2 includes a pair of back side frames 1L and 1R, a back upper frame 3 and a back lower frame 5 connected between the two back side frames 1L and 1R, and a headrest frame 7 extending upward centrally from the back upper frame 3.

The back side frames 1L and 1R each consist of a metallic plate member having a laterally facing major plane, and extend substantially vertically. Each back side frame 1L, 1R is provided with a peripheral flange projecting in the inboard direction for reinforcement purpose. The lower end of each backside frame 1L, 1R is rotatably coupled to the rear end of the corresponding cushion side frame F1 via a reclining mechanism R that holds the tilt angle of the backside frames 1L, 1R with respect to the cushion side frames F1 at a selected angle in a per se known manner. The left back side frame 1L and the right back side frame 1R are spaced apart in the lateral direction to define the width of the seat back S2. A back support member 8 consisting of a mesh or solid board is supported between the two back side frames 1L and 1R by four elastic joint members 9 each having one end engaging the back support member 8 and another end engaged by the corresponding back side frame 1L, 1R. The back support member 8 supports the pad assembly C1 from behind for the purpose of supporting the back part of the occupant from behind in a resilient manner.

The back upper frame 3 is formed by a metallic pipe member having an inverted U shape when viewed from the front. The two ends of the back upper frame 3 overlap with the upper parts of the inner side surfaces of the respective back side frames 1L and 1R, and are joined thereto by welding or the like. The back lower frame 5 is also formed by a metallic pipe member, and extends laterally between the lower parts of the two backside frames 1L and 1R. The two ends of the back lower frame 5 are welded to the inner side surfaces of the respective backside frames 1L and 1R.

The headrest frame 7 is provided with a first support portion 50 consisting of an inverted U shaped pipe member including a pair of vertical legs having lower ends welded to the front sides of the back upper frame, and a cross piece extending between the upper ends of the vertical legs. The vertical legs serve as a head rest pillar. The head rest frame 7 is further provided with a second support portion 52 consisting of an inverted U shaped rod member having lower ends welded to the vertical legs of the first support portion 50, and an upper end projecting above and forwardly of the cross piece of the first support portion 50, and a third support portion 54 also consisting of an inverted U shaped rod member including a pair of vertical legs welded to the vertical legs of the first support portion 50, and an upper end projecting above and forwardly of the cross piece of the second support portion 50 and welded to the upper end of the second support portion 52. The first support portion 50, the second support portion 52 and the third support portion 54 jointly form the skeletal head rest frame 7 of the head rest S3.

A shoulder frame 6 made of a metallic rod member extends from each vertical leg of the first support portion 50 to the outer end of the back upper frame 3 of the corresponding side to support the shoulder part of the pad assembly C1.

As shown in FIG. 3, a connecting bracket 10 is attached to the rear side of the lower end part of each back side frame 1L, 1R by welding or the like. The connecting bracket 10 is provided with a screw hole for attaching the back board C2 to the back side frames 1L, 1R.

A pair of upper sub side frames 30LU and 30RU made of rod members project in the inboard direction from either back side frame 1L, 1R. Each upper sub side frame 30LU, 30RU includes a vertically extending main part 32, a lower end welded to the inner side of the corresponding back side frame 1L, 1R and an upper end welded to an inner side of a corresponding lateral end part of the back upper frame 3. A similar pair of lower sub side frames 30LD and 30RD made of rod members project in the inboard direction from either back side frame 1L, 1R. Each lower sub side frame 30LD, 30RD includes a vertically extending main part 32, a lower end welded to the rear side of the corresponding back side frame 1L, 1R and an upper end also welded to the rear side of the corresponding back side frame 1L, 1R. These main parts 32 are all located well above the connecting brackets 10.

Figure 8:
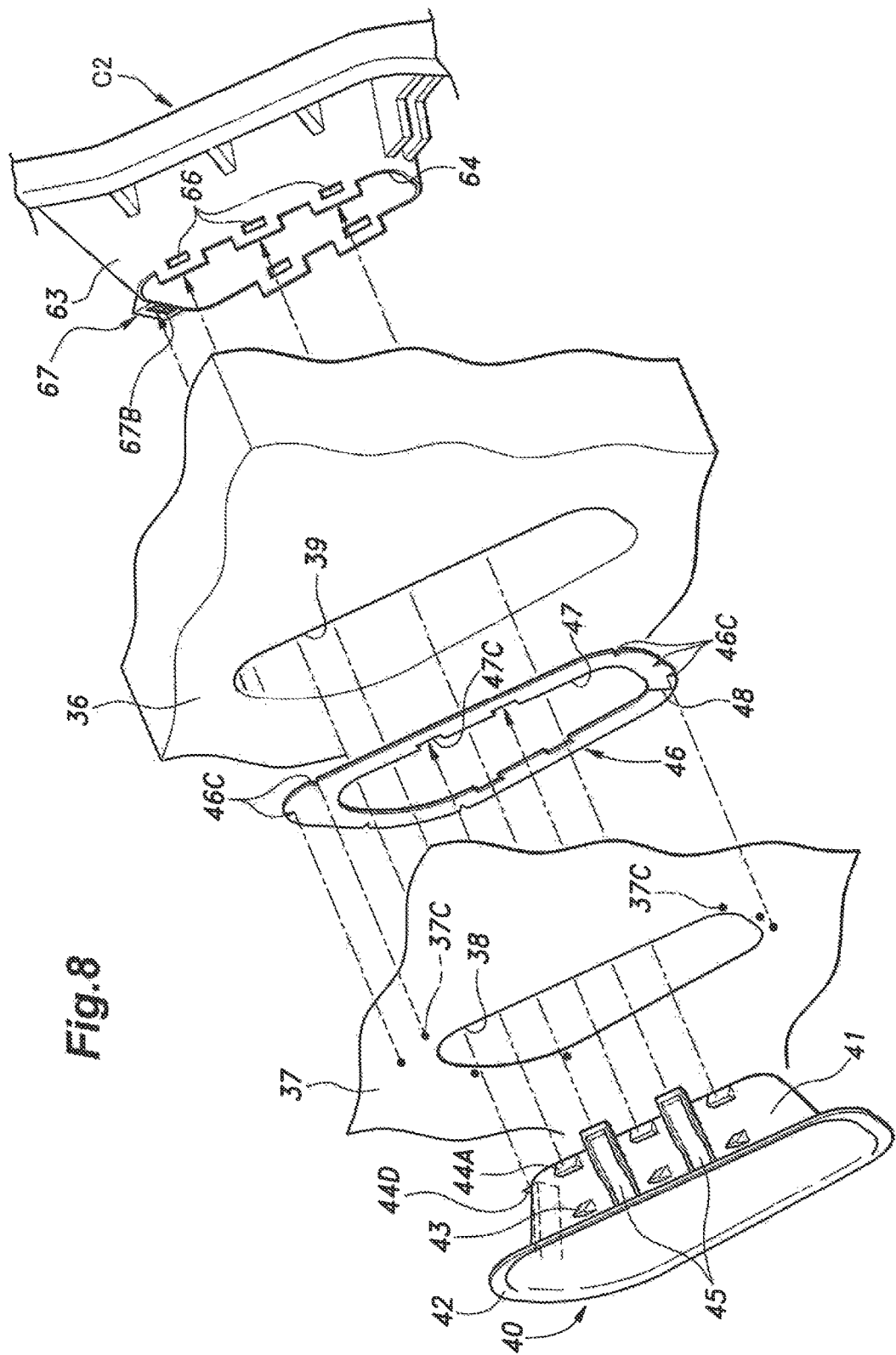
FIG. 8 is an exploded perspective view of various components defining an opening in a seat back.

As shown in FIGS. 2 and 4, the pad assembly C1 is provided with a pad 36 which is made of a cushioning material and supported by the seat back frame F2 from behind, and a skin member 37 covering the front side of the pad 36. The skin member 37 may be made of fabric or plastic sheet that covers the front surface of the pad 36, and is formed with a pair of openings 38 (first openings) at positions corresponding to the openings 12 in the shoulder parts of the seat back S2. The pad 36 is also formed with openings 39 (third openings) that are passed through the pad 36 at positions corresponding to the openings 38 of the skin member 37. The openings 38 and 39 are substantially rectangular, and are conformal to each other. As shown in FIG. 8, the peripheral part of the skin member 37 surrounding each opening 39 is provided with markings 37C for the convenience of assembly work as will be described hereinafter. In the illustrated embodiments, these markings 37C are printed on the back side of the skin member 37.

Each opening 12 in the seat back S2 is fitted with a garnish 40. The garnish 40 is provided with a tubular portion 41 defining a garnish hole 40H extending axially over the entire length thereof and having a substantially rectangular cross section, and a radial flange 42 provided at the front end thereof as a terminal end of a flared portion extending from the front end of the tubular portion 41. The outer peripheral surface of the tubular portion 41 includes a first surface 41A facing upward, a second surface 41B facing in the outboard direction, a third surface 41C facing downward, and a fourth surface 41D facing in the inboard direction. The first surface 41A is provided with three engagement claws 43 projecting therefrom, and the third surface 41C is provided with two engagement claws 43 projecting therefrom, the engagement claws 43 being arranged along the flange 42 so as to define a certain gap between the engagement claws 43 and the flange 42.

The first surface 41A is further provided with three first surface engagement claws 44A such that each first surface engagement claw 44A aligns with a corresponding one of the engagement claws 43 formed on the first surface 41A at a prescribed distance behind the corresponding engagement claw 43. The third surface 41C is similarly provided with two third surface engagement claws 44C such that each third surface engagement claw 44C aligns with a corresponding one of the engagement claws 43 formed on the third surface 41C at a prescribed distance behind the corresponding engagement claw 43. The fourth surface 41D is provided with a fourth surface engagement claw 44D that projects obliquely in an inboard and rearward direction from a front part of the fourth surface 41D.

A pair of projections 45 each projecting obliquely upward and rearward from a front end part of the first surface 41A are provided on either side of the central engagement claw 43 so as to be each located substantially centrally between the adjoining central engagement claws 43. A similar pair of projections 45 project obliquely downward and rearward from a front end part of the third surface 41C in a laterally staggered relationship to the engagement claws 43. As clearly shown in FIG. 4, the projections 45 protrude more radially outward than the first surface engagement claws 44A and the third surface engagement claws 44C. In particular, the projections 45 are configured and dimensioned so as to abut against the inner peripheral surface of the pad opening 39 (third opening) when the garnish 40 is fitted into the pad opening 39.

As shown in FIG. 4, an annular plate 46 is interposed between the flange 42 of the garnish 40 and the engagement claws 43. The annular plate 46 is provided with a quadrangular shape, and as shown in FIG. 6, defines a plate opening 47 (second opening) which substantially conforms to the outer profile of the tubular portion 41. The annular plate 46 is made of a plastic material which is more deformable than the garnish 40 and less deformable than the pad 36. The annular plate 46 is provided with a cut 48 extending from the outer periphery thereof to the inner periphery thereof. The inner periphery of the annular plate 46 is provided with four cutouts 47C recessed outward in a substantially rectangular shape at positions corresponding to the projections 45. The outer periphery of the annular plate 46 is provided with seven notches 46C recessed inward in a wedge shape at positions corresponding to the markings 37C affixed to the skin member 37.

As shown in FIGS. 4 and 8, the front side of the annular plate 46 is laid onto the back surface of the skin member 37 such that the skin member opening 38 and the plate opening 47 align to each other, and the annular plate 46 is sewn to the peripheral part of the skin member 37 surrounding the skin member opening 38. Thus, when the annular plate 46 is interposed between the flange 42 and the engagement claws 43, the part of the skin member 37 surrounding the skin member opening 38 is also interposed between the flange 42 of the garnish 40 and the engagement claws 43 so that the flange 42 conceals the sewn part of the skin member 37 from a view from the front. Therefore, at the periphery of the opening 12, the flange 42, the skin member 37, the annular plate 46, and the engagement claws 43 are laid one onto another in that order from the front.

As shown in FIG. 2, the back board C2 consists of a plate member made of plastic material, and extends along the back surface of the seat back S2. The back board C2 is provided with a substantially rectangular lower part 59, an intermediate part 60 projecting laterally outward from either side and opposing the shoulders of the occupant, and an upper part 61 tapered toward the upper end thereof and opposing the head of the occupant.

Each laterally projecting part of the intermediate part 60 is provided with a fourth opening 62 defined by a tubular extension 63 projecting integrally and forwardly from the material of the back board C2. These openings 62 correspond to the openings 12 of the seat back S2. The front end of each tubular extension 63 is provided with engagement holes 66 arranged along the front edge of the tubular extension 63.

As shown in FIG. 4, when the tubular portion 41 of the garnish 40 is inserted into the opening 39 of the pad 36, the tubular portion 41 is received in the front end of the tubular extension 63, and the engagement claws 44A on the tubular portion 41 snap fit into the corresponding engagement holes 66 of the tubular extension 63. This engagement is accomplished against the biasing force of the pad 36. Therefore, owing to the barbed configuration of the engagement claws 44A and the resilient force of the pad 36, the engagement claws 44A can be firmly engaged by the engagement holes 66.

Figure 7:
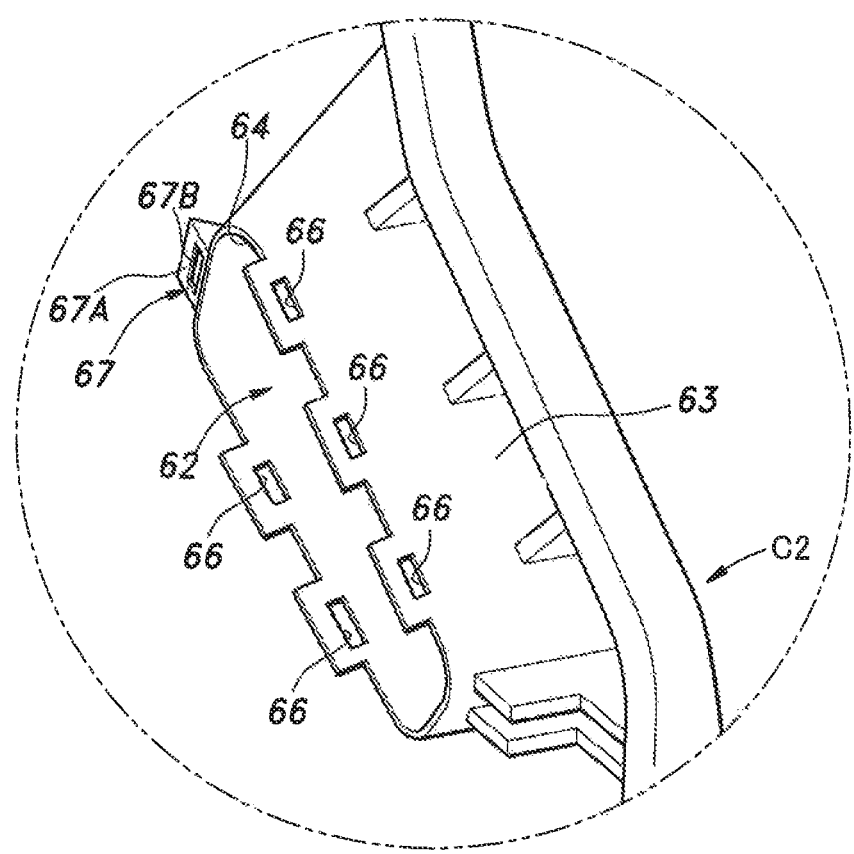
FIG. 7 is an enlarged view of a part indicated by VII in FIG. 2.

At a part of the tubular extension 63 corresponding to the fourth surface engagement claw 44D when the tubular portion 41 of the garnish 40 is inserted into the tubular extension 63, an engagement portion 67 is provided. As shown in FIG. 7, the engagement portion 67 includes a projecting wall 67A projecting laterally from the tubular extension 63 and an engagement hole 67B passed through the projecting wall 67A in the fore and aft direction. When the tubular portion 41 of the garnish 40 is inserted into the tubular extension 63, the fourth surface engagement claw 44D is engaged by the engagement hole 67B of the engagement portion 67.

The lower part 59 of the back board C2 is provided with two pairs of engagement portions 68 along either side part of the lower part 59. These engagement portions 68 are configured to engage the main parts 32 of the respective upper and lower sub side frames 30LU, 30RU, 30LD and 30RD. Although not shown in the drawings, the intermediate part 60 and the upper part 61 of the back board C2 may be provided with similar engagement portions configured to engage the first support portion 50 and the shoulder frames 6.

A pair of through holes 72 are provided in a lower end of the back board C2 at positions corresponding to the screw holes of the connecting brackets 10. The back board C2 can be attached to the seat back frame F2 via the engagement portions 68 and the screws passed into the through holes 72, and threaded into the threaded holes of the connecting brackets 10.

The process of assembling the seat back S2 of the vehicle seat S is described in the following. First of all, as shown in FIG. 8, the front surface of the annular plate 46 is placed against the part of the back surface of the skin member 37 surrounding the skin member opening 38. At this time, the relative positioning of the skin member 37 and the annular plate 46 can be accomplished by matching the notches 46C of the annular plate 46 with the markings 37C of the skin member 37. Then, the skin member 37 is sewn onto the annular plate 46 over the entire circumference thereof. The cut 48 in the annular plate 46 can be used for positioning the needle of a sewing machine at a midpoint between the inner and outer peripheries of the annular plate 46. The skin member 37 and the annular plate 46 are then sewn together along the line defined by such midpoints.

The pad 36 is prepared, and the skin member 37 is adhered or placed on the surface of the pad 36 such that the openings 38 of the skin member 37 and the openings 39 of the pad 36 align with each other.

The tubular portion 41 of the garnish 40 is inserted into the opening 38 of the skin member 37, the plate opening 47 and the opening 39 of the pad 36 in that order. At this time, the garnish 40 is oriented in such a manner that the projections 45 and the fourth surface engagement claw 44D align with the corresponding cutouts 47 formed on the inner periphery of the annular plate 46 surrounding the opening 47 thereof. As the tubular portion 41 of the garnish 40 is pushed into the opening 39 of the pad 36, owing to the barbed configuration of the engagement claws 43, the annular plate 46 is snap fitted into the gap between the flange 42 and the engagement claws 43.

The back board C2 is then placed against the back side of the seat back frame F2, and the engagement portions 68 of the back board C2 are pushed onto the main parts 32 of the respective upper and lower sub side frames 30LU, 30RU, 30LD and 30RD into snap engagement. The back board C2 may be secured to the seat back frame F2 by using other additional engagement portions not shown in the drawings. Also, screws are passed into the through holes 72, and are threaded into the corresponding threaded holes of the respective connecting brackets 10.

At the same time, the front end of the tubular extension 63 of the back board C2 are passed into the opening 39 of the pad 36 from the rear, and are fitted onto the rear end of the tubular portion 41 of the garnish 40 against the resilient force caused by the compression of the pad 36. At this time, the front edge of the tubular extension 63 is guided by a gap defined between the outer periphery of the rear end of the tubular portion 41 and the projections 45 projecting from the outer peripheral surface of the tubular portion 41, and the first surface engagement claws 44A and the third surface engagement claws 44C are engaged by the holes 66 of the tubular extension 63 while the fourth surface engagement claw 44D is engaged by the engagement hole 67B passed through the projecting wall 67A. Thus, the openings 62 (fourth openings) defined by the tubular extension 63 and the garnish holes 40H jointly define the openings 12 of the seat back S2.

In this vehicle seat S, because the annular plate 46 sewn or otherwise attached to the skin member 37 is interposed between the flange 42 and the engagement claws 43 of the garnish 40, even when a significant tension is applied to the skin member 37, the annular plate 46 is prevented from shifting relative to the garnish 40. Therefore, no gap is created around the flange 42 of the garnish 40 so that the external appearance of the opening 12 can be enhanced.

Because the annular plate 46 sewn or otherwise attached to the skin member 37 is interposed between the flange 42 and the engagement claws 43 of the garnish 40, the part of the skin member 37 surrounding the annular plate 46 is prevented from being subjected to localized strain. In particular, since the annular plate 46 is made of more deformable material than the garnish 40, the annular plate 46 spreads any localized stress that may be applied to the surrounding part of the skin member 37. This also contributes to the minimization of localized strain that may be applied to the skin member 37.

Because the annular plate 46 is sewn to the skin member 37, the two parts can be attached to each other in a highly durable manner. The cut 48 in the annular plate 46 allows the needle of the sewing machine to be moved to the mid point between the inner and outer peripheries of the annular plate 46 so that the manufacturing process can be facilitated.

Since the tubular portion 41 of the garnish 40 and the tubular extension of the back board C2 are fitted one into the other in a telescopic manner, the assembly process is facilitated, and the stiffness of the surrounding part of the seat back S2 can be enhanced.

Owing to the presence of the cut 48 in the annular plate 46, the tubular portion 41 of the garnish 40 can be closely fitted into the opening 47 of the annular plate 46 in a tight fit without any difficulty.

The presence of the notches 46C in the annular plate 46 facilitates the assembling of the skin member 37 to the annular plate 46. The presence of the cutouts 47 facilitates the correct assembling of the annular plate 46 onto the tubular portion 41 of the garnish 40.

Since the tubular portion 41 of the garnish 40 and the tubular extension of the back board C2 are engaged with each other by snap fitting the engagement claws 44A and 44C into the corresponding engagement holes 66 of the tubular extension 63, the two parts can be firmly joined together in an effortless manner.

The foregoing embodiment is only given as an example, and the present invention can be modified in various ways without departing from the spirit of the present invention. For instance, the skin member 37 may be bonded to the annular plate 46 by welding, by using an adhesive agent or by using two-side tape, instead of by sewing. The garnish 40 may also be made of metal, wood or any other desired material.

The tubular extension 63 of the back board C2 is optional, and the rear end of the tubular portion 41 of the garnish 40 may be connected to the back board C2, for instance, the rear end of the tubular portion 41 of the garnish 40 may be by directly attached to the back board C2 or via a suitable attachment member. Alternatively, the back board C2 may be provided with an opening into which a garnish similar to the garnish 40 of the illustrated embodiment is passed from behind so that the abutting ends of the two garnish may be joined to each other via any suitable engagement arrangement.

Figure 9:
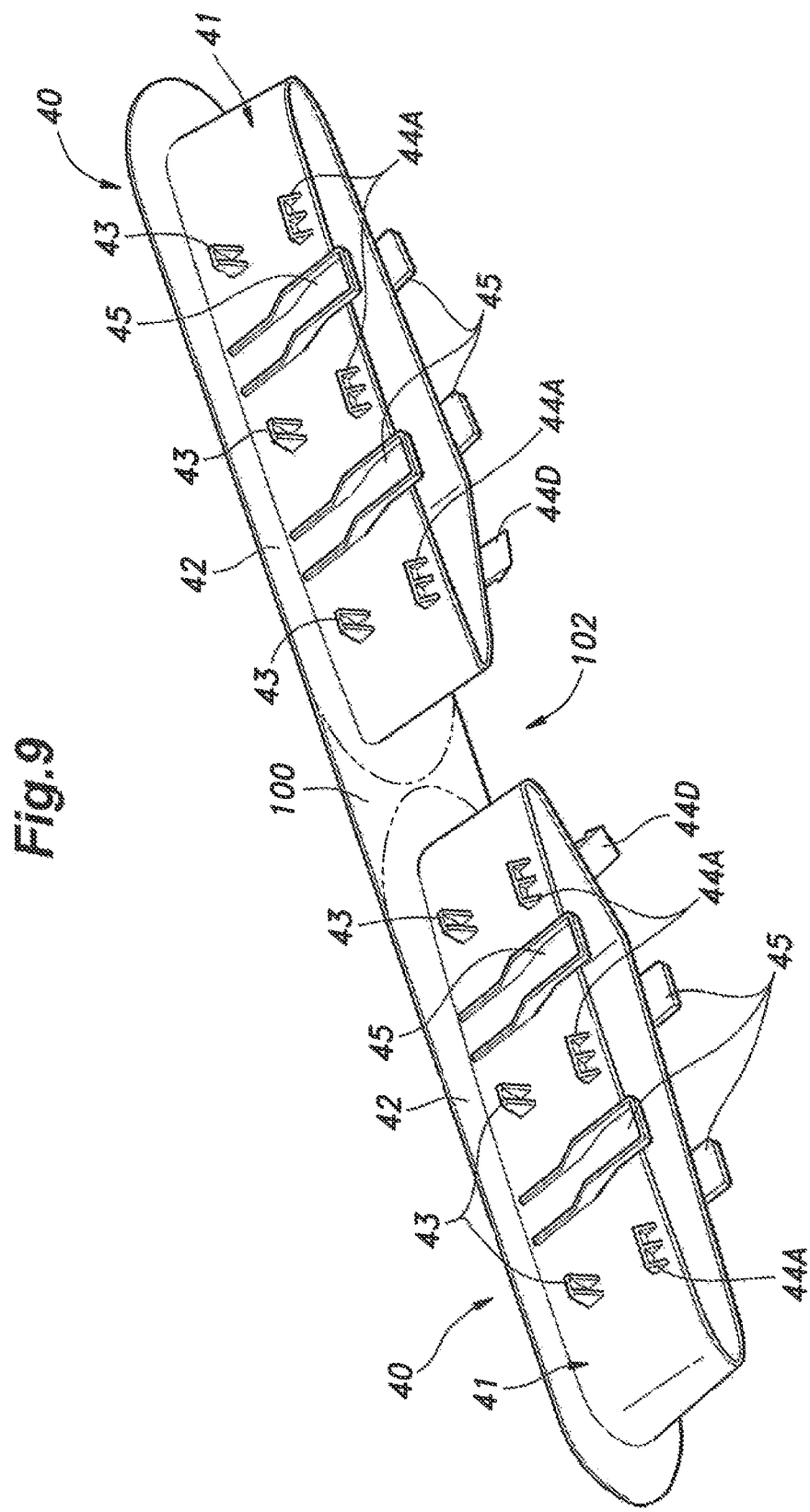
FIG. 9 is a perspective view of a pair of garnishes given as a modified embodiment of the present invention.

In a modified embodiment illustrated in FIG. 9, a pair of garnishes (each similar to the garish 40 of the foregoing embodiment) are joined to each other by an extension 100 of the flanges 42. Thus, the surface of the seat back S2 between the two garnishes 40 is covered by this extension 100. This allows the two garnishes 40 to be manufactured and assembled as a single piece so that the cost of the garnishes may be reduced. Also, the extension 100 may enhance the external appearance of the seat back S2.

The present invention can be used not only as a vehicle seat but also as a seat for use in homes and workplaces.

The invention claimed is:

1. A seat, comprising:
a frame;
a pad supported by the frame;
a skin member covering a front surface of the pad and provided with a first opening;
an annular plate having a second opening and attached to a part of the skin member surrounding the first opening so that the first opening opposes the second opening;
a garnish including a tubular portion passed into the first opening and the second opening, and retained onto the pad, a flange provided at a front end of the tubular portion and having a larger outer diameter than the tubular portion, and an engagement claw projecting from an outer periphery of the tubular portion, and engaging the annular plate between the flange and the engagement claw; and
a back board covering a rear surface of the pad and attached to the frame,
wherein a part of the skin member surrounding the first opening is interposed between the flange and the engagement claw jointly with the annular plate, and the pad is provided with a third opening passed therethrough in alignment with the first opening and the second opening, and a rear end of the tubular portion of the garnish is passed into the third opening, and is connected to the back board.

2. The seat according to claim 1, wherein an outer peripheral part of the annular plate is provided with a plurality of notches, and parts of the skin member corresponding to the notches are provided with corresponding markings.

3. The seat according to claim 1, wherein the engagement claw is provided with a barbed configuration.

4. The seat according to claim 1, wherein the back board is provided with a tubular extension projecting forward and centrally defining a fourth opening of the back board, and the rear end of the tubular portion of the garnish fits into or onto a front end of the tubular extension of the back board, the rear end of the tubular portion of the garnish and the front end of the tubular extension of the back board being engaged to each other via an engagement feature.

5. The seat according to claim 4, wherein the engagement feature includes an engagement claw with a barbed configuration projecting from an outer periphery of the tubular portion, and a hole formed in a front end portion of the tubular extension of the back board and configured to receive the engagement claw.

6. The seat according to claim 4, wherein the tubular portion of the garnish is provided with a plurality of radial projections projecting outward from an outer periphery thereof, and abutting an inner peripheral surface of the third opening of the pad.

7. The seat according to claim 6, wherein an inner peripheral part of the annular plate is provided with a plurality of cutouts at positions corresponding to the radial projections on the tubular portion of the garnish.

8. The seat according to claim 1, wherein the annular plate is sewn to the skin member.

9. Me seat according to claim 8, wherein the annular plate is provided with a cut extending between an outer periphery thereof and an inner periphery thereof.

10. The seat according to claim 8, wherein the annular plate is sewn to the skin member along a circumferential direction of the first opening.

11. A seat, comprising:
a frame;
a pad supported by the frame;
a skin member covering a front surface of the pad and provided with a first opening;
an annular plate having a second opening and attached to a part of the skin member surrounding the first opening so that the first opening opposes the second opening;
a garnish including a tubular portion passed into the first opening and the second opening, and retained onto the pad, a flange provided at a front end of the tubular portion and having a larger outer diameter than the tubular portion, and an engagement claw projecting from an outer periphery of the tubular portion, and engaging the annular plate between the flange and the engagement claw,
wherein
the annular plate is sewn to the skin member, and
the annular plate is provided with a cut extending between an outer periphery thereof and an inner periphery thereof.

12. The seat according to claim 11, wherein the annular plate is sewn to the skin member along a circumferential direction of the first opening.

13. The seat according to claim 11, wherein the engagement claw is provided with a barbed configuration.

* * * * *